(12) United States Patent
Buckley

(10) Patent No.: US 7,493,298 B2
(45) Date of Patent: Feb. 17, 2009

(54) METHOD AND SYSTEM FOR DECISION ORIENTED SYSTEMS ENGINEERING

(75) Inventor: Michael E. Buckley, 4304 Mount Vernon Pl., Fredericksburg, VA (US) 22408

(73) Assignee: Michael E. Buckley, Spotsylvania, VA (US)

( * ) Notice: Subject to any disclaimer, the term of this patent is extended or adjusted under 35 U.S.C. 154(b) by 0 days.

(21) Appl. No.: 11/657,832

(22) Filed: Jan. 25, 2007

(65) Prior Publication Data

US 2007/0198452 A1 Aug. 23, 2007

(51) Int. Cl.
G06F 17/00 (2006.01)
G06N 5/02 (2006.01)

(52) U.S. Cl. ...................................... 706/47
(58) Field of Classification Search ................ None
See application file for complete search history.

(56) References Cited

U.S. PATENT DOCUMENTS

| | | | |
|---|---|---|---|
| 5,233,513 A | 8/1993 | Doyle | |
| 5,799,293 A | 8/1998 | Kaepp | |
| 6,016,477 A | 1/2000 | Ehnebuske et al. | |
| 6,151,582 A | 11/2000 | Huang et al. | |
| 6,226,620 B1 | 5/2001 | Oon | |
| 6,249,768 B1 | 6/2001 | Tulskie, Jr. et al. | |
| 6,249,769 B1 | 6/2001 | Ruffin et al. | |
| 6,253,115 B1 | 6/2001 | Martin et al. | |
| 6,260,033 B1 | 7/2001 | Tatsuoka | |
| 6,282,531 B1 | 8/2001 | Haughton et al. | |
| 6,327,551 B1 | 12/2001 | Peterson et al. | |
| 6,442,438 B1 | 8/2002 | Naillon | |
| 6,455,593 B1 * | 9/2002 | Grimley et al. | ............. 514/729 |
| 6,487,545 B1 | 11/2002 | Wical | |
| 6,493,331 B1 * | 12/2002 | Walton et al. | ............... 370/341 |
| 6,493,697 B1 | 12/2002 | Stier et al. | |
| 6,502,039 B1 * | 12/2002 | Theilhaber et al. | ............ 702/19 |
| 6,609,119 B1 * | 8/2003 | Meghlaoui | .................... 706/25 |
| 6,684,373 B1 * | 1/2004 | Bodine et al. | .................. 716/6 |
| 6,701,496 B1 * | 3/2004 | Fischer | ......................... 716/6 |
| 6,708,155 B1 * | 3/2004 | Honarvar et al. | ............... 705/7 |
| 6,714,865 B2 * | 3/2004 | Angwin et al. | .............. 701/213 |
| 6,744,743 B2 * | 6/2004 | Walton et al. | ............... 370/318 |
| 6,795,815 B2 * | 9/2004 | Zhang | ......................... 706/46 |
| 6,834,191 B2 * | 12/2004 | Wallentin et al. | ........... 455/442 |
| 6,871,789 B2 * | 3/2005 | Hilton et al. | ................ 235/494 |
| 6,907,416 B2 * | 6/2005 | Tasooji et al. | ................. 706/50 |
| 6,952,688 B1 * | 10/2005 | Goldman et al. | ............. 706/45 |

(Continued)

OTHER PUBLICATIONS

Systems engineering: an essential engineering discipline for the 21st Century Rhodes, D.H.; Software Engineering, 2002. ICSE 2002. Proceedings of the 24rd International Conference on 2002 p. 4.*

(Continued)

Primary Examiner—Michael B Holmes

(57) ABSTRACT

A method for efficiently engineering large, complex systems is provided. The method uses a uniquely defined decision model to lead the design effort by structuring and analyzing decision making needs of the people who will use the system before any design efforts can constrain the solution. While other methods may suffice for incremental system developments, i.e., system developments where small improvements over legacy systems are the objective, this method is particularly useful where revolutionary system improvements, or wholly new system developments is the objective.

20 Claims, 9 Drawing Sheets

U.S. PATENT DOCUMENTS

| | | | | |
|---|---|---|---|---|
| 6,998,117 | B1* | 2/2006 | Roth et al. | 424/93.2 |
| 7,000,173 | B2* | 2/2006 | Buckley et al. | 714/790 |
| 7,072,663 | B2* | 7/2006 | Ramos et al. | 455/453 |
| 7,158,505 | B2* | 1/2007 | Dick et al. | 370/350 |
| 7,260,770 | B2* | 8/2007 | Stewart et al. | 714/790 |
| 7,321,567 | B2* | 1/2008 | Qazi et al. | 370/278 |
| 7,356,416 | B2* | 4/2008 | Busa | 702/19 |
| 7,366,516 | B1* | 4/2008 | Oh et al. | 455/445 |
| 7,369,534 | B2* | 5/2008 | Amerga et al. | 370/350 |
| 7,369,889 | B2* | 5/2008 | Astrom et al. | 600/509 |
| 7,384,781 | B2* | 6/2008 | Moyle et al. | 435/287.2 |
| 7,409,569 | B2* | 8/2008 | Illowsky et al. | 713/323 |
| 7,454,542 | B2* | 11/2008 | Illowsky et al. | 710/62 |
| 2002/0165841 | A1 | 11/2002 | Quaile | |
| 2002/0169737 | A1 | 11/2002 | Armstrong | |

OTHER PUBLICATIONS

An approach for systems evolution Jie Wu; Qiulin Ding; Systems, Man and Cybernetics, 2004 IEEE International Conference on vol. 3, Oct. 10-13, 2004 pp. 2114-2118 vol. 3 Digital Object Identifier 10.1109/ICSMC.2004.1400639.*

Knowledge science project Kingsley, S.; Systems, Man, and Cybernetics, 1991. Decision Aiding for Complex Systems, Conference Proceedings., 1991 IEEE International Conference on Oct. 13-16, 1991 pp. 521-524 vol. 1 Digital Object Identifier 10.1109/ICSMC.1991.169737.*

Virtual modelling of compartmental pharmacokinetic systems Prado, M.; Roa, L.M.; Engineering in Medicine and Biology Society, 2005. IEEE-EMBS 2005. 27th Annual International Conference of the 2005 pp. 7-10 Digital Object Identifier 10.1109/IEMBS.2005.1616328.*

Flight hardware delivery breakthroughs via engineering/business best-practices synthesis Clark, K.P.; Aerospace Conference Proceedings, 2002. IEEE vol. 7, Mar. 9-16, 2002 pp. 7-3409-7-3428 vol. 7 Digital Object Identifier 10.1109/AERO.2002.1035318.*

Vertical integration issues in knowledge based design systems Fenves, S.J.; Terk, M.; Systems Engineering, 1990., IEEE International Conference on Aug. 9-11, 1990 pp. 39-43 Digital Object Identifier 10.1109/ICSYSE.1990.203094.*

System-of-Systems Engineering Management: A Review of Modern History and a Path Forward Gorod, A.; Sauser, B.; Boardman, J.; Systems Journal, IEEE : Accepted for future publication vol. PP, Forthcoming, 2003 pp. 1-1 Digital Object Identifier 10.1109/JSYST.2008.2007163.*

The responsibility management system for collaborative meeting scheduling in the Distributed System Engineering project Molina Espinosa, J.M.; Drira, K.; Villemur, T.; Knowledge Media Networking, 2002. Proceedings. IEEE Workshop on Jul. 10-12, 2002 pp. 114-119 Digital Object Identifier 10.1109/KMN.2002.1115172.*

* cited by examiner

METHOD AND SYSTEM FOR DECISION ORIENTED SYSTEMS ENGINEERING

RELATED APPLICATIONS

This application is a non-provisional application claiming priority to U.S. provisional application No. 60/354,180, filed on Feb. 4, 2002, which is incorporated herein for all purposes.

FIELD OF THE INVENTION

The invention in general relates to the fields of management, operations, strategy, and engineering, and more particularly to the interdisciplinary field of systems engineering.

BACKGROUND

Function allocation is the assignment of function responsibility to people, software, and hardware. Function allocation is arguably the most significant challenge facing System Engineering in the design of large, complex systems. Currently, there are no structured, systematic approaches in systems engineering practice that adequately address the function allocation challenge.

To address the function allocation challenge, most systems engineering practices employ a process or functional view of the system early in the design effort to capture requirements and conceptualize the design. Process-driven or function-driven approaches are very limited because they too quickly focus on how things are done. By focusing too soon on how things are done, should be done, or might be done, system design options can be prematurely constrained early in the design effort.

Those practices that do not employ a functional view of the system often use object-oriented or task oriented approaches to accomplish the same result. Object oriented methods link behaviors to objects early. Object-oriented methods require the development of an object model early. Whether they are called behaviors or functions, they are associated with objects and in so doing, there is often a premature assignment of functions to objects, prior to proper consideration of man-machine issues. Task oriented methods can be superior, but they also too quickly concern the designers with how things are done.

Accordingly, it would also be advantageous to provide a more structured, systematic approach to function allocation without prematurely constraining the system design. Similarly, it would be advantageous to directly link requirements capture to function allocation estimates and in so doing, develop design options for comparative evaluation before having to deal with the constraints of a functional or process model. An ideal solution would provide an evolutionary framework that dovetails with state-of-the art System Engineering tools and practices, while capable of supporting and sustaining a holistic treatment of diverse issues such as training, automation, manning, software development requirements (including Human Computer Interface issues), legacy system use, and requirements for new system developments. Just such a solution to the problems noted above and more, is made possible by my invention.

SUMMARY

An illustrative summary of my invention, with particular reference to the detailed embodiment described below, includes a method for building complex systems that begins with the construction of a decision model to capture the decision making requirements of the system. This information is then used to guide all other design efforts. The method described here differs from prior approaches in that it is aimed at first analyzing a decision making view of the system. A decision making view is one focused on the decision making support requirements of the system when used by the people, intelligent agents, or some combination thereof. In the decision making view, the people (intelligent agents) are considered part of the system from the outset. An early and proper understanding of the decision making requirements for the system is critical to efficient design.

Here, a novel, systematic approach to the problem of human-centered design and the challenge of function allocation is described. This method of Decision-Oriented Systems Engineering (or DOSE for short), employs a multi-step process that generates decision modeling tools such as a "knowledge map" and other artifacts, and thereby articulates decision-making support requirements and captures function allocation design decisions.

In DOSE a decision model of system responsibilities (represented via knowledge maps and referred to as knowledge cells) is constructed. This decision model serves as a framework to evolve requirements and design. The decision model is represented with decision chains, knowledge evolution summaries, and specialized knowledge maps. These graphics vehicles are used to capture system responsibilities, analyze these responsibilities for possible simplification, reassignment, automation, etc., and ultimately record allocation decisions for hardware, software, and people responsibilities in fulfilling the overall system responsibilities.

THE DRAWING

The invention may be more readily appreciated from the following detailed description, when read in conjunction with the accompanying drawings, in which.

Figure 1:
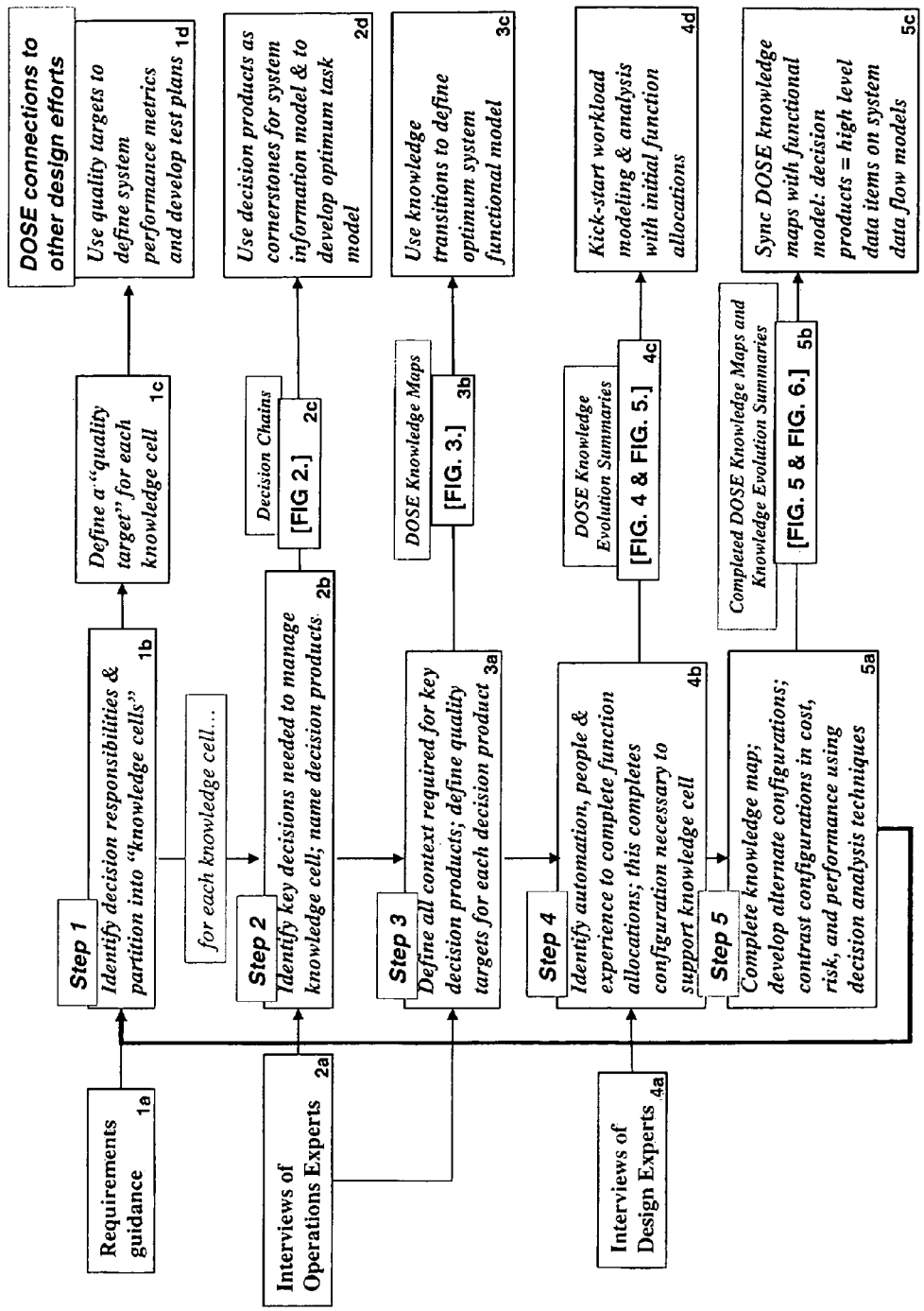
FIG. 1 is a flow chart illustrating steps in designing a system using decision oriented systems engineering according to an embodiment of the invention.
Figure 2:
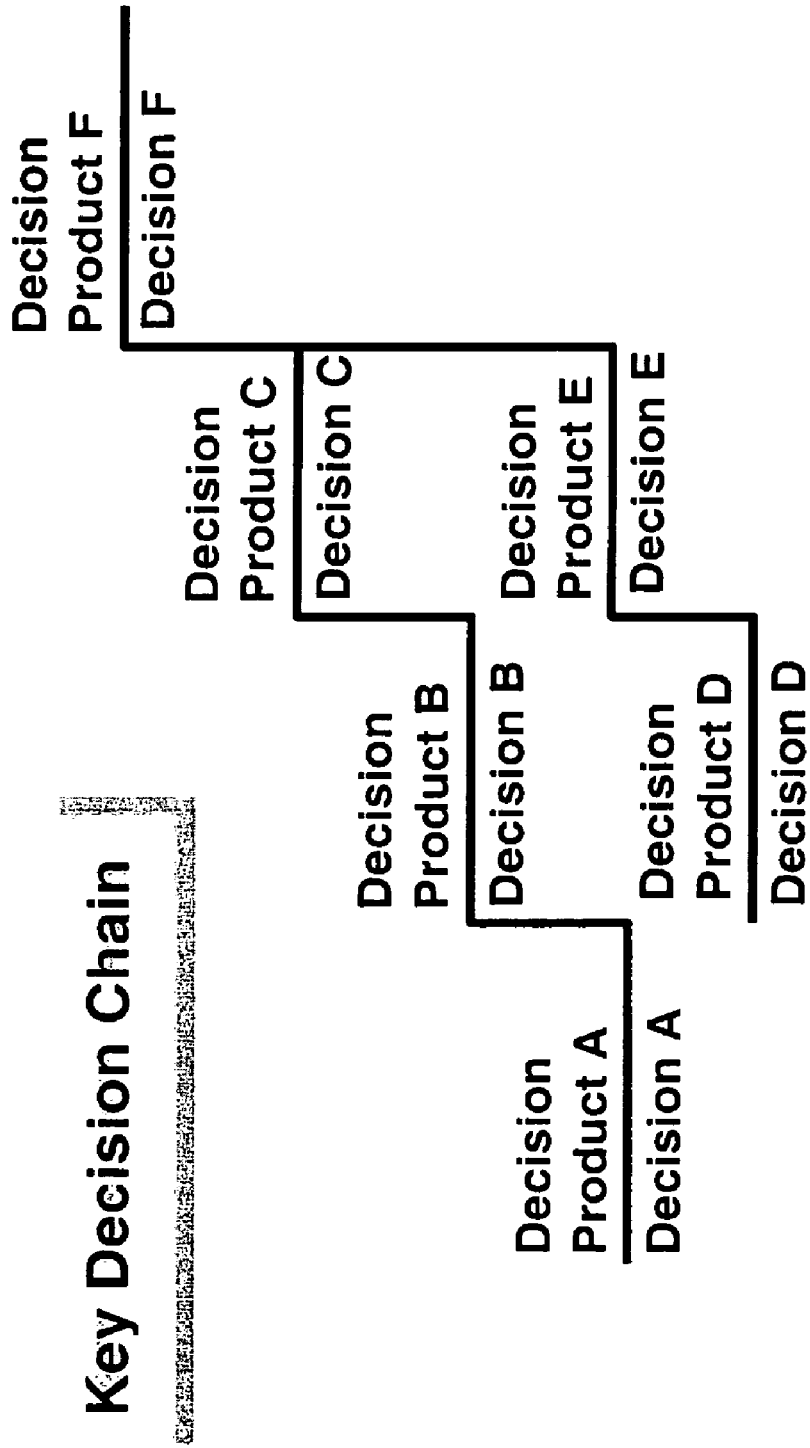
FIG. 2 illustrates a process for identifying key decisions used in step 2 of FIG. 1.
Figure 3:
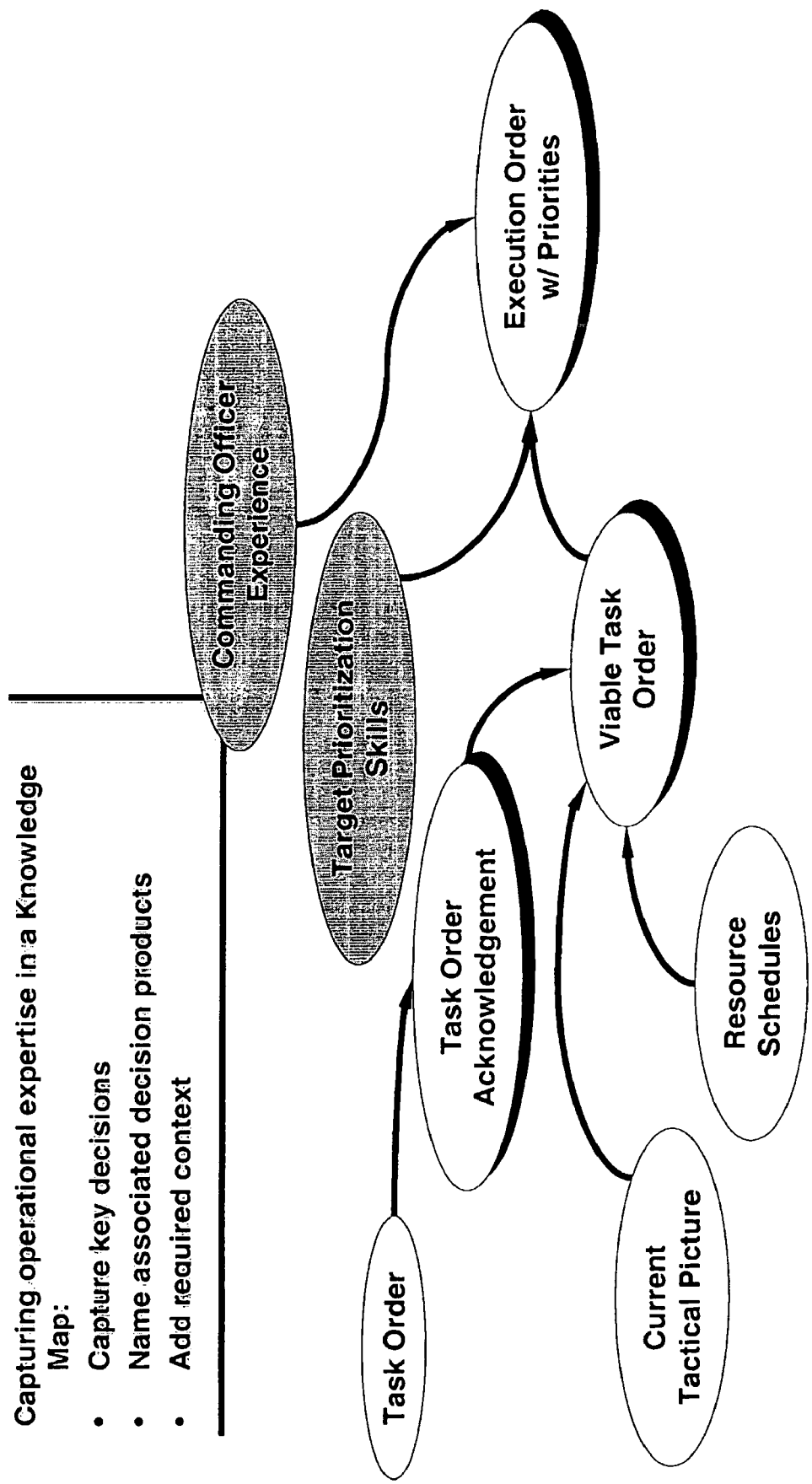
FIG. 3 illustrates a process for capturing decision contexts in a knowledge map according to step 3 of FIG. 1.
Figure 4:
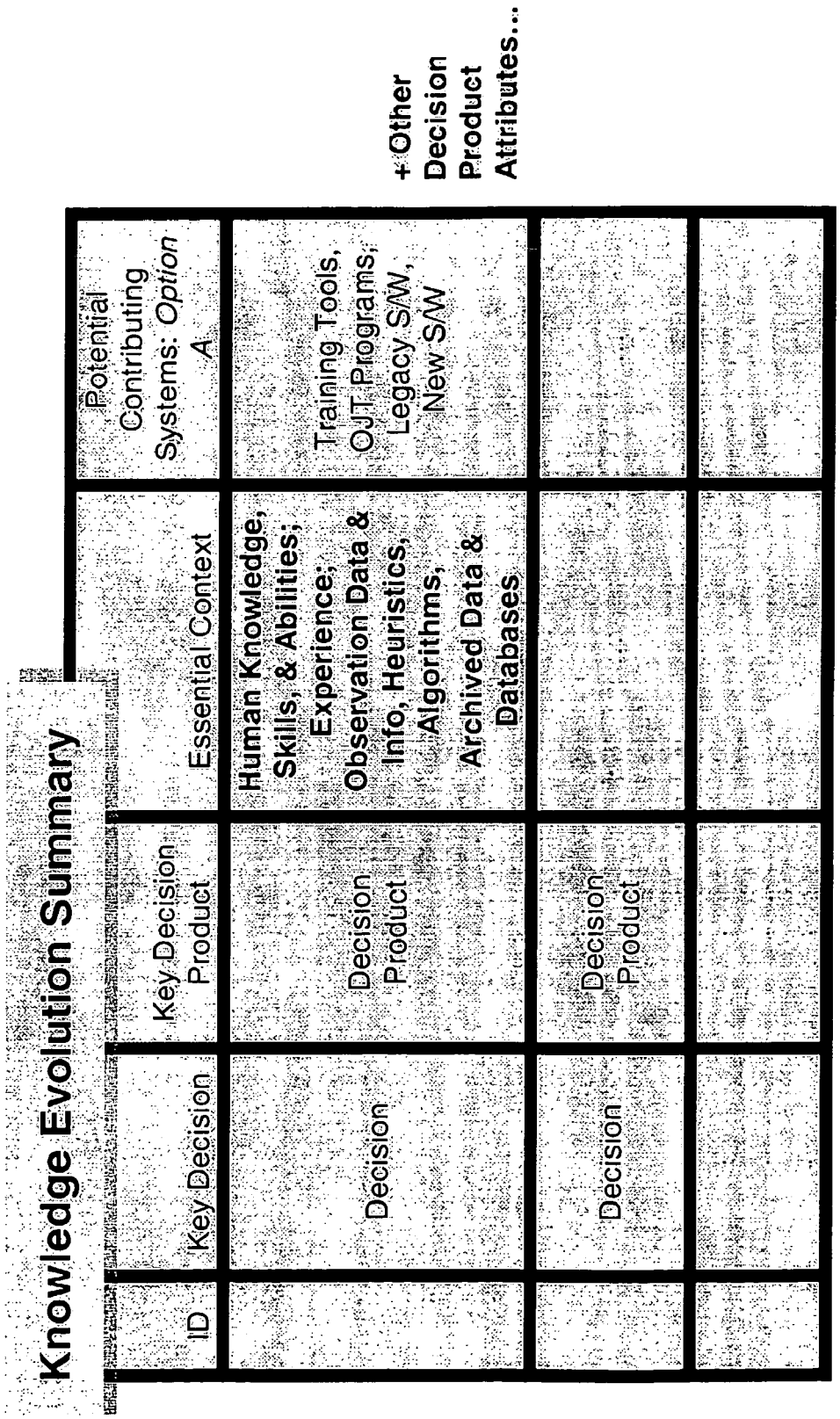
FIG. 4 illustrates a process for capturing decision context, candidate contributing systems, and other decision product attributes in knowledge evolution summaries according to step 4 of FIG. 1.
Figure 5:
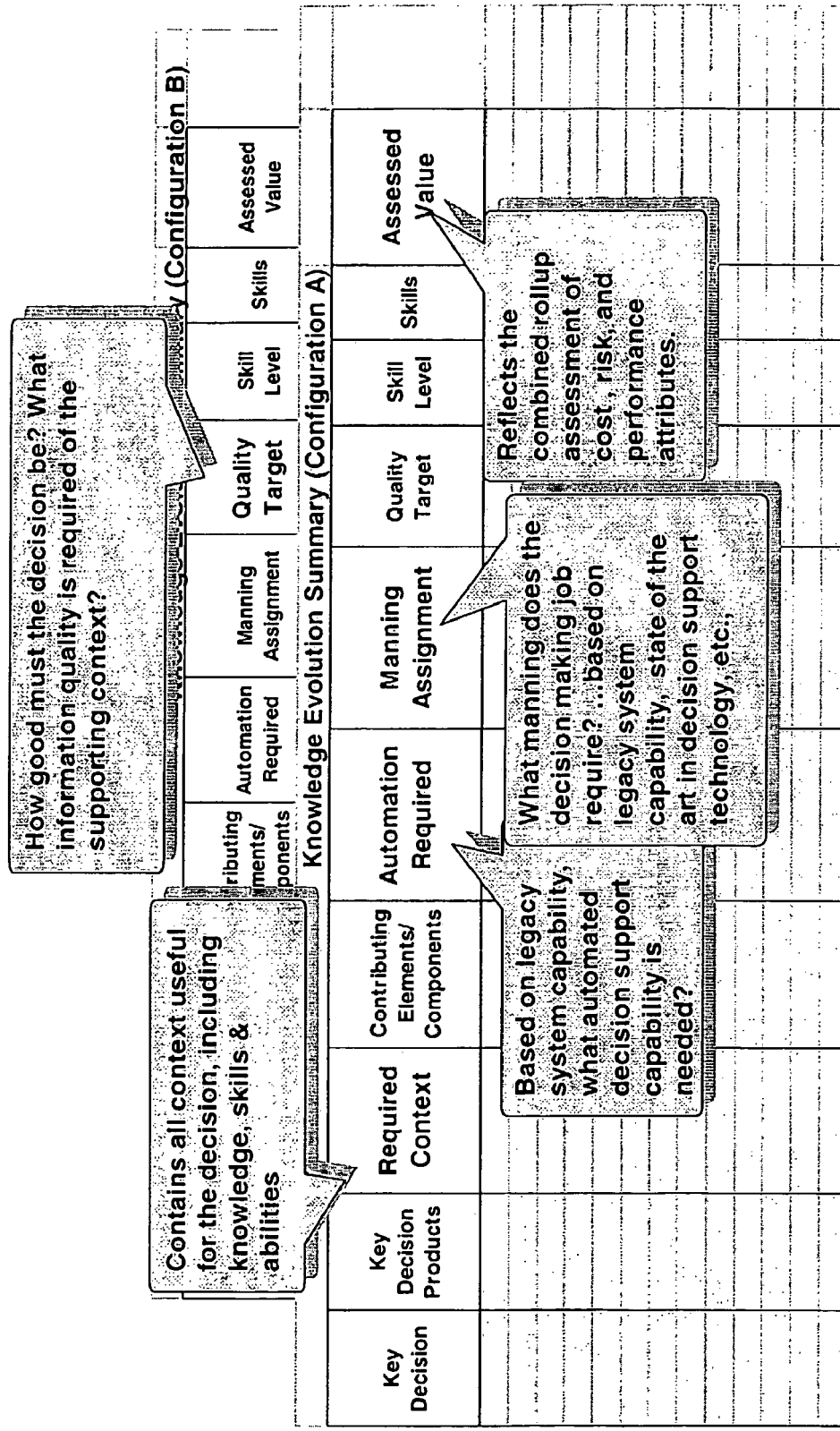
Figure 6:
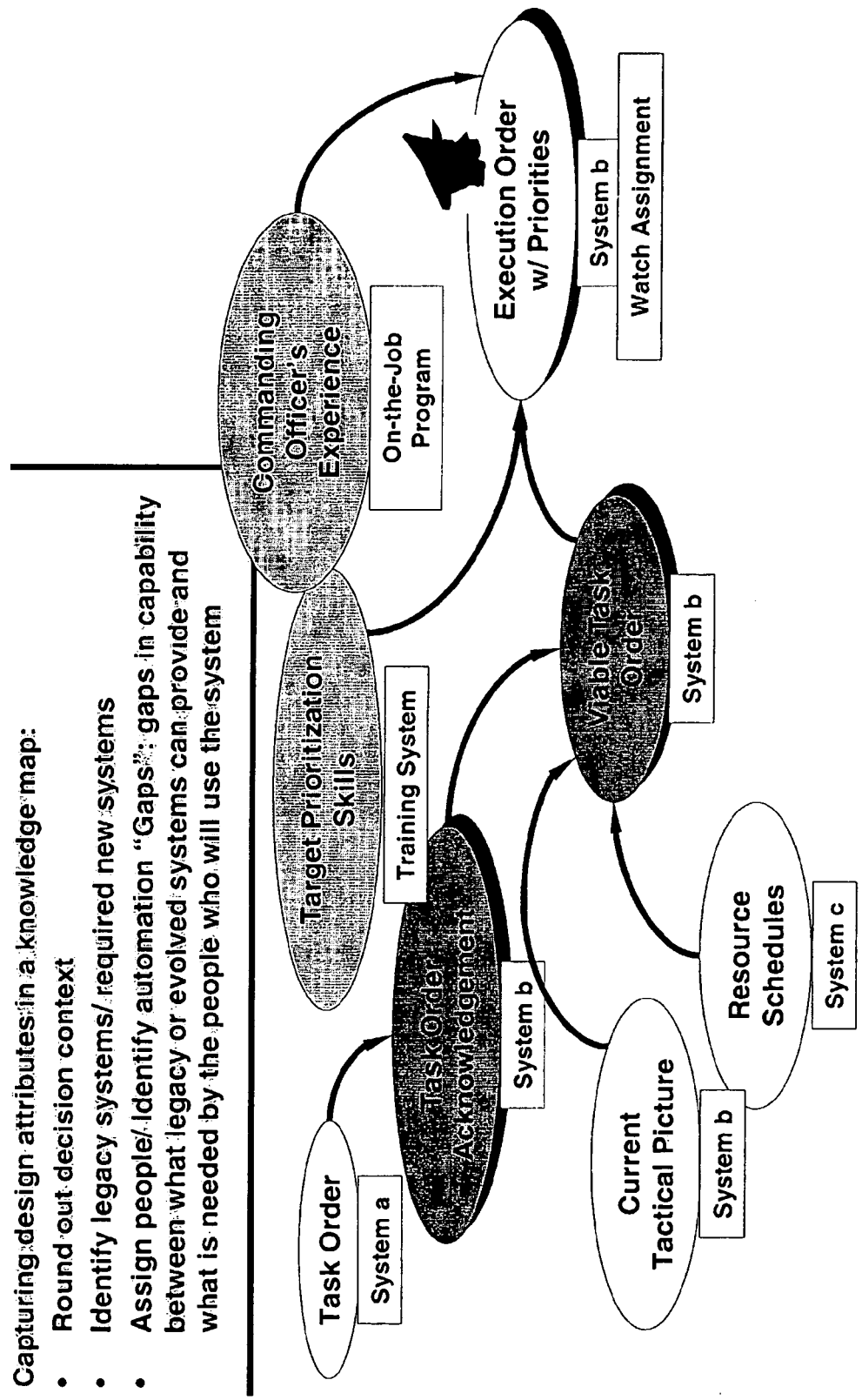
Figure 7:
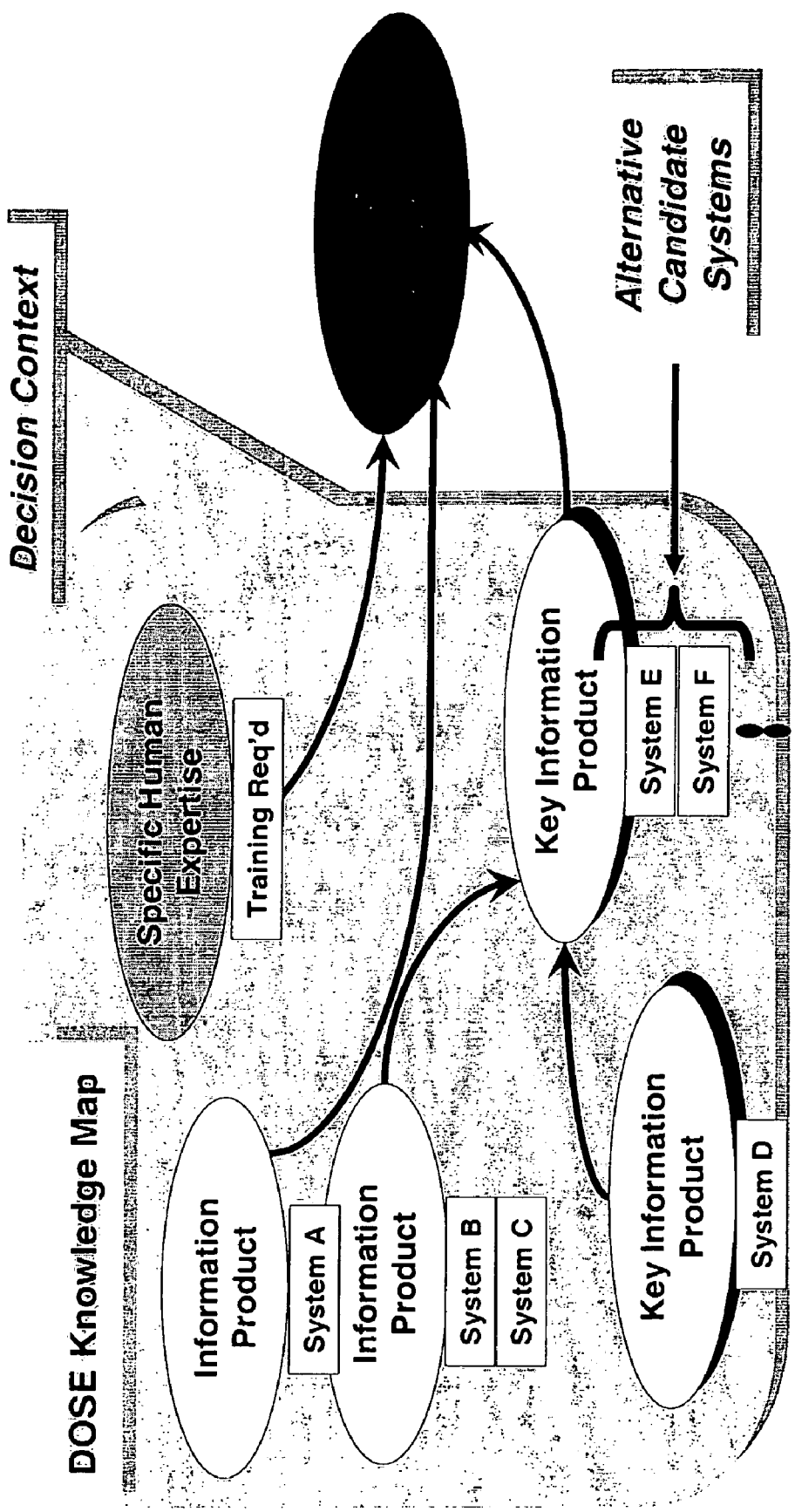
Figure 8:
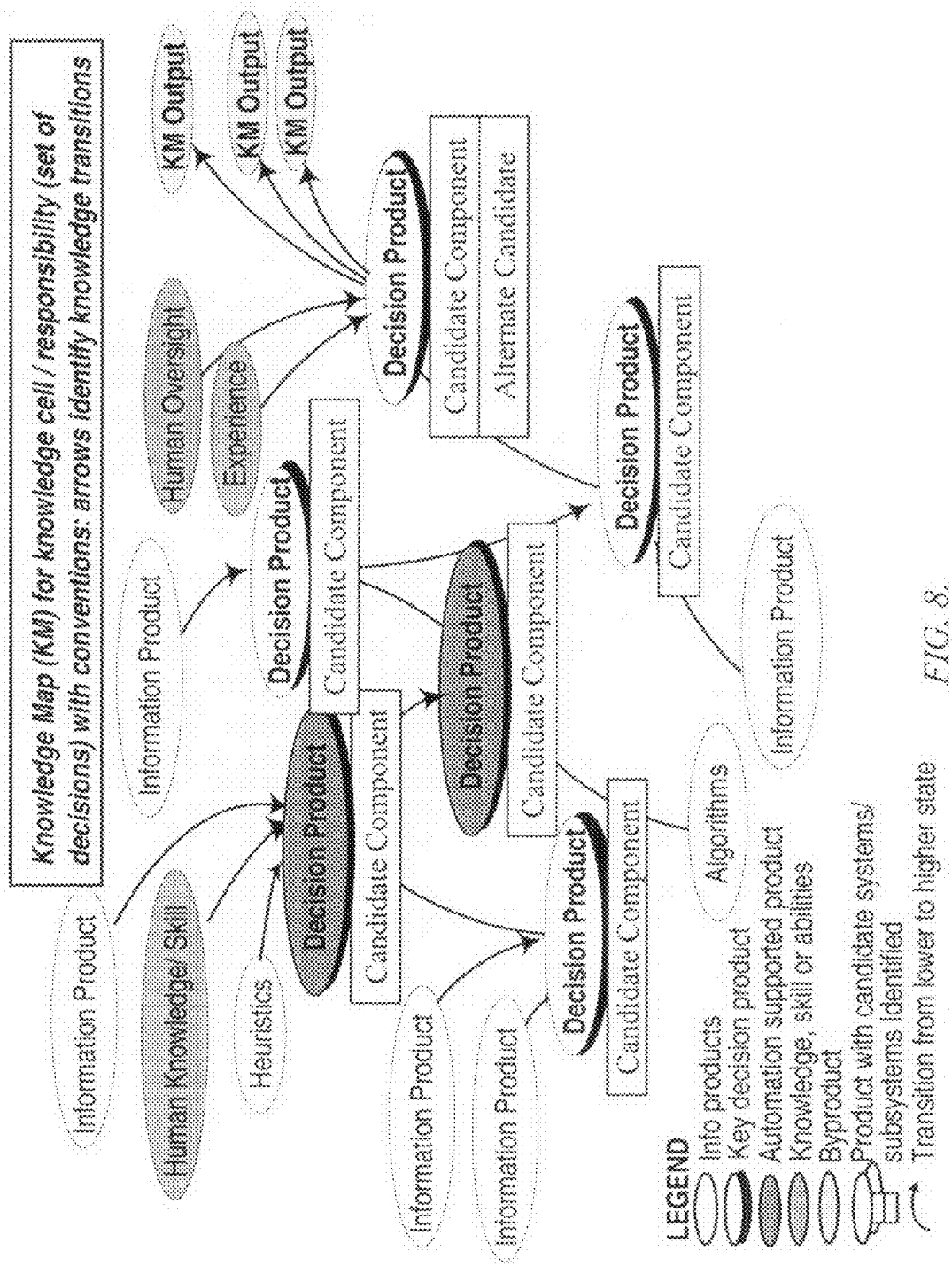
Figure 9:
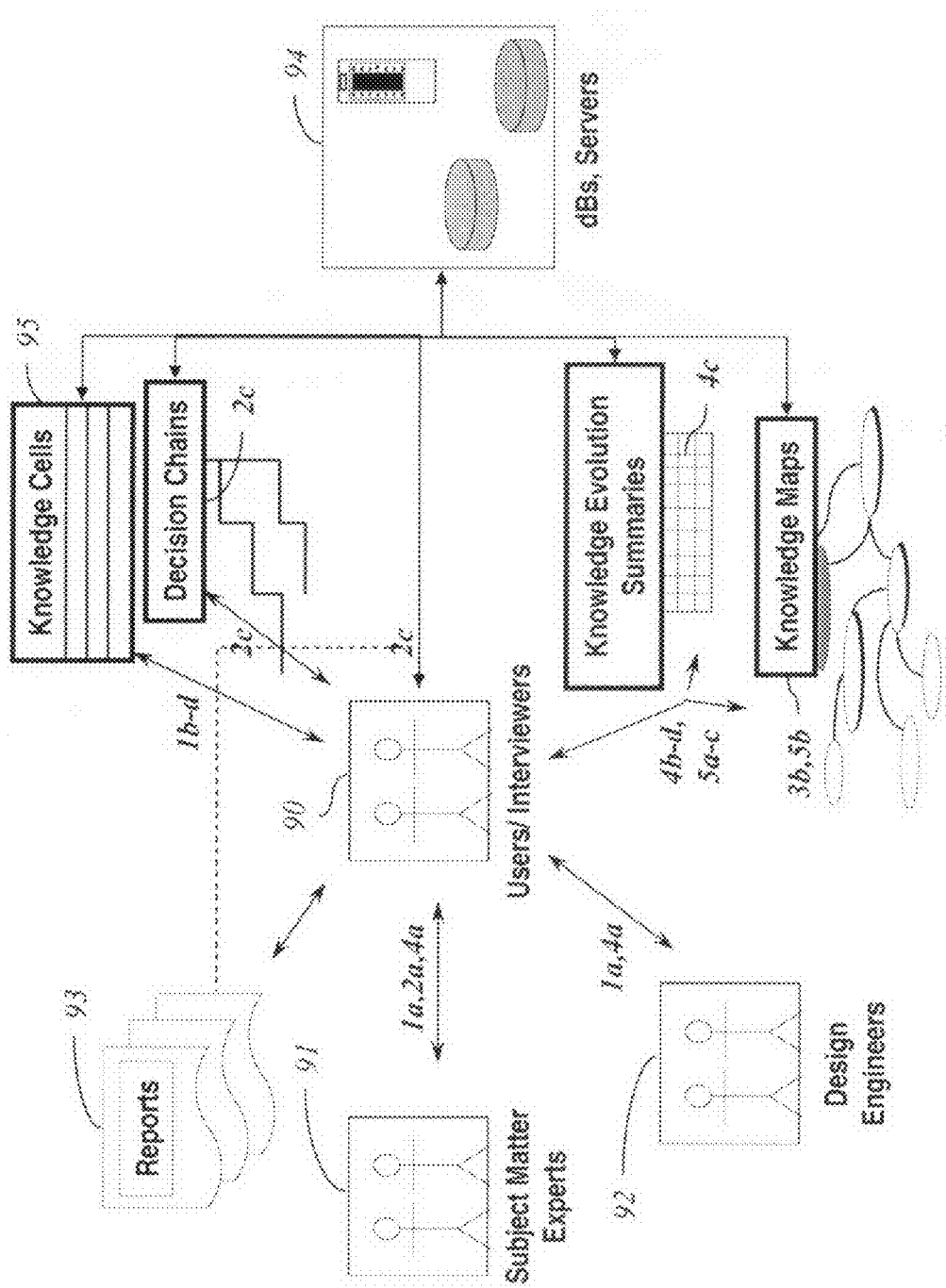

FIG. 5 further illustrates aspects of knowledge evolution summaries;

FIG. 6 illustrates a process for capturing design attributes to complete knowledge maps according to step 5 of FIG. 1;

FIG. 7 further illustrates aspects of a knowledge map, in which all nodes represent information products (including knowledge, skills, and abilities that provide context for information and decision products downstream);

FIG. 8 illustrates a description of DOSE knowledge map conventions according to a preferred embodiment of the invention; and FIG. 9 is an illustrative block diagram of one implementation of a partially automated system according to an embodiment of the invention.

DETAILED DESCRIPTION OF AN ILLUSTRATIVE EMBODIMENT OF THE INVENTION

Functional Requirements and DOSE

Functional requirements are typically requirements that are precise enough to buy hardware or software with specific capabilities. For example, functional requirements for an electric motor may be readily stated, although there may be expert assessment needed to nail down specific parameters. Often there is uncertainty regarding the specifics of the motor's range of operation: torque demands, transient loading, ambient operating environment, etc. In fact, the real test for an engineer is usually in selecting the most cost effective motor that will best satisfy its envelope of most likely demand with some applied safety factor. However, consider this: before the motor can be sized, we must understand the decisions that the motor will be called on to support, what will it be used for and what will it be asked to do? To know this we should understand how it will be used and, if there is any flexibility in how it will be used, and understand what human decisions it will support. The DOSE method starts here, with these decisions. If any decision design is made without a relatively complete understanding of the decision making support requirements that the motor might support, we run the risk of overly constraining motor requirements.

An important objective, then, is to understand the decision-making support requirements first, and use this information to drive the design process. The DOSE method begins by building a decision model that identifies the critical decisions that must be managed and also identifies all significant information in whatever form that may be called on to support the successful management of these critical decisions.

The DOSE decision model satisfies these and other needs. To assist in the process, DOSE uses tools such as Key Decision Chains, Knowledge Evolution Summaries (KES's), and DOSE Knowledge Maps (DOSE KM's), described in more detail below, to represent a system and the important aspects of what it needs to accomplish. Working with available requirements documentation and subject matter experts from the appropriate problem domains, these Key Decision Chains, KES's and DOSE KM's are constructed to capture and characterize key cognitive decisions, their products, and required contextual information needed to support the key decisions, including key cognitive skills, experience, and abilities.

If DOSE is consistently applied in tandem with other SE (Systems Engineering) practices, it simplifies the design process considerably, especially the more complex systems involving teams working with mixes of new, evolving, and legacy systems.

A Preferred Embodiment of the DOSE Method.

Successful Systems Engineering processes are typically marked by the evolution of multiple system views in the design process. Each view focuses on certain aspects of the system being defined, often to the (temporary) exclusion of other aspects that may be equally important. Typical to the use of the functional view is the notion that one can build a functional model of the system without any differentiation of things handled by the machine and things handled by the human. This assumption is rarely true. All large-scale, complex systems are marked by complex interaction among decision makers, operators, systems, and subsystems, hardware and software. As the term implies, a complex system includes a combination of many associated, often interrelated parts, which cannot be represented accurately by a trivial model.

It is the decision-making view that is the focus of DOSE, which captures such knowledge in a decision model of the system to lead the design process. When the decision model is extended to include potential key information products considered necessary by the subject matter experts to support the key decisions the decision model is effectively complete.

Scenario-based design practices are used in the DOSE process. First, anticipated scenarios are screened for key, domain specific sets of responsibilities. For each major responsibility set, the system requirement may be couched as a set of decision responsibilities that must be successfully managed for successful system performance. Each set of decision responsibilities is called a knowledge cell. To construct the decision models to represent the domain-specific responsibility sets, a knowledge mapping technique is used. As an analysis technique, knowledge mapping has been applied in several fields. Knowledge mapping has been applied in Decision Analysis, Knowledge Based System Design, and Information Management Systems, often under a different set of conventions. The knowledge mapping used here has been developed to support a systems engineering focus: it uses simple conventions covering only selected aspects of the system under design, focusing on aspects intended to complement other more traditional system views, especially the functional and structural views.

In applying the DOSE method one begins first by characterizing a system in terms of its evolution of knowledge: data to information to decision products (representing decisions made) and their byproducts. It is these cognitive decisions that can be said to represent the key substance of the information system being designed, the essential data upon which to build.

The knowledge maps of DOSE capture the key decisions of the problem domain by abstracting decision products for each of the key decisions. These decision products may then be presented as nodes on a directed graph designed to represent the evolution of knowledge in a system (inclusive of the human complement) from lower level states to higher-level states. Every node on a DOSE knowledge map represents an information product in a form that may be recorded or at least described. In depicting this "evolution" of knowledge on a knowledge map, nodes generally proceed from data to information to decision products and their by-products (such as messages or directives resulting from this evolution). The complete knowledge evolution depicted in the knowledge map represents the DOSE method's current understanding of the knowledge cell and its extent.

A DOSE Knowledge Map As An Evolution.

One should recognize that the knowledge maps of DOSE represent an evolution of data to information to decision products, etc., and not a data flow. The notion of a "flow" typically carries with it intrinsic notions of continuity and conservation, notions that would be misleading in the use of the DOSE knowledge maps. The evolution of knowledge that is represented on a DOSE knowledge map represents an evolution of decision contexts to support some set of decision choices that must be made for successful management of the problem domain. The knowledge map is meant to capture the "superset" of key information, supporting decision products, human knowledge, skills and abilities that may be brought into play to make the key decisions. No two individuals or teams of individuals will rely on exactly the same contextual support or use it in the same way. The knowledge map is designed to capture the superset of available information so that any particular decision maker's needs have been recorded so that system designers may be prepared to present it for the decision maker's use (if the information is available)

when it may be useful. In certain instances, decision makers using the system may be called upon to make decisions when the information they deem critical is not available. This is perhaps the most important reason to maintain the distinction between an evolution of knowledge and a flow of information, and herein lies one of the several advantages of using knowledge mapping to represent high level system requirements. There is no requirement for all information elements to he available for decision responsibilities to be supported, and in turn, for a given system (designed to support these decision responsibilities) to be able to operate.

The following, together with FIGS. 1 through 5, provide an illustrative example of the DOSE method. The designer typically begins with a delineation of sets of decision responsibilities in the domain that need to be spanned to cover all that the system will be expected handle. In partitioning these "sets of decision responsibilities" it is preferable to be responsive and remain malleable to more efficient partitions (or better defined knowledge cells) as they become apparent. Knowledge partitions are efficient if they meet the following criteria: the defined set of decision responsibilities (knowledge cell) should represent a reasonably "complete", assignable duty or responsibility that one could expect to levy on an individual or team as a whole. Does the assignable responsibility require a related set of knowledge skills and abilities, perhaps because of the problem domain?

For each domain area, key decisions are identified and abstracted into decision products that sketch out a first cut at a knowledge map that represents the set of decision responsibilities that must be managed for successful operation. This information is first captured in a Key Decision Chain, next in a Knowledge Evolution Summary, and finally in a DOSE Knowledge Map.

The knowledge map is "fleshed out" by adding all known contexts necessary to support decision-making requirements. By "context" we mean those information elements, and that human knowledge, skills, and abilities, and any other decision products considered necessary to support key the decisions that must be managed. Information products whose generation may be supported wholly or in part by automation are also identified. Known system responsibilities for low-level information feeding higher-level decision products are identified. Finally, design choices are made regarding which information products can be automated and to what level and are recorded on the knowledge map. Consistent with design decisions, sources for information products are identified, whether they are to be provided by legacy systems, new systems, people, or any combination thereof. The preferred method of capturing the information is to get the subject matter experts (SME) to focus on naming the key decisions, establishing the order in which decisions are made, and try and capture as much context as possible while keeping the SMEs from arguing about how better decisions are made. There can be a real art to this as few people can put on the hat of facilitator (and recorder) and refrain from engaging the SMEs as fellow experts, but good Knowledge Engineers can do this well as they focus on elicitation and structuring the information.

An Example of DOSE Method Mechanics

The following is a more specific example of how DOSE may be implemented. For illustration purposes this is described in the context of a complex system in the form of an advanced naval ship system. Those skilled in the art will recognize its applicability to any other system design, including those of substantially less complexity. In other words, any system that involves or supports people in some activity can benefit from DOSE.

Step 1. Partition Decision Responsibilities and Identify Knowledge Cells; Identify Decision Objectives and High Level Quality Targets for the Knowledge Cells (see FIG. 1, blocks 1a, 1b, 1c, and 1d).

Using DOSE, the process begins with a partitioning of responsibilities for system operation into mission areas and problem domains (decision responsibility sets). Operations Subject Matter Experts (SMEs) are polled in this effort. The partitioning effort should follow this rule: The span of required decision management responsibility should be consistent with what an Operations SME would consider a reasonable assignment for either an individual or a team of people collaborating in the effort. Preferably one limits the decision space for the partition to those decisions that are integral to the decision objectives. If one does not follow this rule, the knowledge map may be more complex than is needed to insure that human system interaction issues are addressed for the given problem domain, and it will eventually become evident that the knowledge map would be better if partitioned into a few components.

Step 2. Capture Key Decisions; Prepare Decision Chain; Define & Establish Quality Targets (see FIG. 1, blocks 2a, 2b, and 2c, and FIG. 2).

Once the responsibility sets are partitioned and established, one is ready to proceed with the capture of key decisions for the Knowledge Maps. After selecting one of the partitioned responsibility sets we proceed to name the key decisions and decision products. This is the basis for developing a Decision Chain.

Recognizing that the Decision Chain, KES, and ultimately the DOSE Knowledge Map are meant to capture a knowledge evolution, one advantageous approach is the use of a "flight of stairs" metaphor during the knowledge engineering interview of Subject Matter Experts (SMEs) to help focus the interview on those key decision products that would represent successful management of the responsibilities. The SMEs are operations experts with hands-on experience in using similar systems and operating in the domain environment and design experts familiar with systems functions (domain and component systems and software engineers) in the domain. Here it is important to first name the "top step", the end product/s of the knowledge evolution. This gives us a target to shoot for and determines when we've finished. Each decision and decision product is identified to complete an evolution or chain that culminates in the decision product on the top step.

In naming the decisions we look for labels that would be appropriate for the decision made, making every effort to avoid concerning ourselves with the alternative values or states of the decision. (This can usually be done unless they are fundamental to the responsibility set; for example, a decision that triggers the activation of another responsibility set.)

Alternately, one can also start at the bottom with the early decisions and proceed until the culminating decision has been named. For example, in FIG. 3 one could start by identifying decisions A and D and defining their associated decision products.

The success of any system is measured by the degree to which the people using the system successfully manage their responsibilities. To this end, "Quality Targets" may be assigned for rating how good the decisions must be. A high level statement of how well the knowledge cell should be managed is needed first. (See block 1c of FIG. 1.)

Step 3. Capture/Resolve Required Decision Context; Develop Initial DOSE Knowledge Maps (KMs) and Knowledge Evolution Summaries (KESs) (see FIG. 1, blocks 3a, 3b, and 3c, and FIG. 3.)

Next, each decision and decision product is identified to complete a chain that takes us to the decision product named in step 2. In naming the decisions we look for labels that would be appropriate for the decision made, making every effort to avoid concerning ourselves with the alternative values or states of the decision. (This can usually be done unless they are fundamental to the responsibility set; for example, a decision that triggers the activation of another responsibility set.) The decisions and decision products are placed in a table (a knowledge evolution summary) that contains additional contextual information considered important to the decision. At this point the focus is on capturing the requirements and the job is done when the required decision context is considered complete.

As the decisions or decision products are named it is preferred to constrain one's thinking to only what is specifically needed to support the humans working with the new system and all that would constitute successful management of the responsibility set, and no more. Though we are not initially interested in understanding the intricacies of how things may be accomplished, some of this becomes useful when one begins constructing knowledge maps to reflect the design. Finally, it is critically important to capture all human cognition along the way, even the little stuff. This would include anything that might find its way into an educational curriculum or experience profile. Usually the preferable way to elicit this kind of information is to ask questions, examples of which might include: "What will make you comfortable in making the decision? How could you make the decision more quickly? What are the sources of uncertainty in making the decisions? Who are best at making these kinds of decisions? How much luck do you think is involved in making consistently good decisions, how would one remove the need for luck. What would be necessary for a easily defensible decision after the fact? Do personality types make a difference, and how? How important is it to be risk averse or risk tolerant and under what conditions do you think performance would be equal?"

The DOSE method is also used to define quality targets for individual decision products. The system should allow access to sufficient information of adequate quality to allow decision makers of given experience and capability to successfully manage the decision space. This requires the definition of individual quality requirements for each of the decision products in a given knowledge cell. (See FIG. 1, block 3a, also FIG. 5).

The DOSE knowledge map is designed to capture the superset of available information so that any particular decision maker's needs have been recorded so that system designers may be prepared to present it for the decision maker's use (if the information is available) when it may be useful. The knowledge mapping used here has been developed to support a systems engineering focus: it uses simple conventions covering only a select few aspects of the system under design, focusing on aspects intended to complement other more traditional system views, especially the functional and structural views.

The knowledge maps of DOSE capture the key decisions of the problem domain by naming decision products for each of the key decisions, and presenting these decision products as nodes on a directed graph designed to represent the evolution of knowledge in a system (inclusive of the human complement) from lower level states to high-level states. Every node on a DOSE knowledge map represents an information product in a form that may be recorded. In depicting this "evolution" of knowledge on a knowledge map, nodes generally proceed from data to information to decision products and their by-products (such as messages or directives resulting from this evolution).

The key decisions and required context are used to sketch out a first cut at a Knowledge Map representing the set of decision responsibilities that must be managed for successful operation. From a requirements perspective, the Knowledge Map is completely defined by adding all critical contexts necessary to support decision-making requirements. Context includes the relevant information, and the required human knowledge, skills, and abilities.

Step 4. Function Allocation Step: Identify Candidate Components, Automation Opportunities, Needed Personnel in the Knowledge Evolution Summaries (see FIGS. 4, 5, and 6)

Completing the KESs directly supports a "design for automation" goal. The "contributing elements/components" entries, allow us to line up legacy systems and candidates to fill specific decision context requirements. FIG. 6 illustrates a high-level view of such a mapping process. Where there is no current capability provided by legacy systems, a new system development (or an extension to a current systems) may be warranted or at least suggested.

The decision product is examined relative to its set of required context elements. How difficult is it going to be to synthesize the decision product based on the available context? The answer to this question helps us quantify the automation difficulty that will be associated with the automation design job. Is the technology even available or, better yet is it practical? If all or part of the responsibility is to remain with an individual who should that person be? And what skill will be needed? What sort of workload demands will be placed on the individual? These questions are addressed with the "Personnel Assignment", Workload Estimates", Skill Level" and "Specific Skill" entries. See, as one example of the typical attributes required to complete the function allocation first cut, FIG. 5 using a database table approach for capture of such information.

The KESs are augmented to accommodate current manpower allocation and automation concepts relevant to the mission area or problem domain. Candidate systems that may contribute to the required decision context are identified. Known system responsibilities for specific support of the decision products are identified where appropriate.

It may be helpful to ask what automation is at this point? Webster defines automation as "the technique of making an apparatus, a process, or a system operate automatically; the state of being operated automatically". While many tasks and processes involved in today's complex systems already exhibit some degree of automation, the automation available provides a reference datum upon which new automation must springboard. In order to focus on the new automation that must be developed, it may be helpful to devise a more specialized definition of automation. In order to help us focus on what the automation will cost for the new system, a useful definition of automation would include: "anything that contributes to reduce the workload in supporting new system operation, including life cycle support) when contrasted with legacy system operation". Such a definition is particularly useful for concept evaluation purposes as this definition removes the time dependence, i.e. use of the general definition of automation that might arguably include even the simplest mechanisms of automatic control.

Step 5. Complete Knowledge Evolution Summaries and Knowledge Maps; Develop and contrast Candidate Configurations in Cost, Risk, and Performance (see FIGS. 5 and 6).

Decision products whose generation may be supported wholly or in part by automation are identified for further analysis. This yields specific candidate automation opportunities. Design decisions regarding which information products will be automated and to what level are captured. Consistent with the design decisions, sources of information products are identified, whether they are to be provided by legacy systems, new systems, people, or any combination thereof. Candidate systems are "matched", yielding candidate configurations.

With respect to KM completeness, the evolution of data and information that is represented on a DOSE knowledge map represents an evolution of decision contexts to support some set of decision choices that should be made for successful management of the problem domain. The knowledge map is meant to capture the "superset" of all information, supporting decision products, human knowledge, skills and abilities that may be brought into play to make the key decisions. No two individuals or teams of individuals will rely on exactly the same contextual support or use it in the same way. The knowledge map is designed to capture the superset of "necessary" information. In this way any particular decision-maker's needs are recorded so that the system may be able to present it for use when it is needed. It is recognized that quite often decision-makers must make decisions in the face of less information than they want or need. In circumstances such as these, knowledge of the "superset" of information may be useful in helping the decision-maker make a "satisficing" decision (—a term used in operations research for problems where optimal solutions may be never found or are by definition impossible due a mix of objective and subjective attributes such as where human preferences apply.)

The KESs summarize the key decisions and their associated products. Other attributes also captured include: Required Context, Contributing Elements/Components, Automation Category, Automation Level, Personnel Assignment, and Skill Level, and Specific Skills. Definitions for the information elements captured in the KESs are provided below. (See FIG. 5.) These attributes should only be considered typical, the actual set of attributes used should be optimized for the problem.

"Key Decisions"—Key decisions are essential decisions related to mission or domain critical operations, managed by an experienced person or group of persons engaged in a mission areas or problem domains. Key decisions are decisions that must be touched by a human, or those that have been traditionally fallen under the purview of a human in past systems. Decisions that must be touched by a human include, at a minimum, decisions that touch legal issues, issues of National Policy, etc.

"Key Decision Products"—A key decision product is an information Product whose name accurately describes the decision if it were to be recorded.

"Required Context" identifies specific information required for generation of the given decision.

"Contributing Elements/Components" identifies elements or components of the system design that may contribute to the generation of the decision product.

"Automation Category" identifies the workload reduction technique/s relied upon to reduce the net workload.

"Automation Level" refers to the automated decision support sophistication.

"Personnel Assignment" identifies the individual or individuals assigned to be responsible for making the decision and generating the information product. In those cases where the generation of the information product is to be wholly automated, the information product is named in order to complete the decision chain and this and next two fields do not apply. The assignment may be dependent upon the specific problem at hand or assignments made elsewhere.

"Workload Estimate" identifies average workload associated with the generation of the decision product (i.e., making the decision, etc.,)

"Skill Level" identifies the level of experience of training necessary or desireable for the position. Again, this may be problem dependent.

"Specific Skills" contains specific skills or training considered necessary to adequately make the decision.

The candidate configurations are evaluated against constraints (typically from external sources, not part of the "negotiable requirement space".) Decision context elements are subjected to an analysis for required quality, resulting in specific inputs to performance specifications. This analysis may also impact functional requirements for the candidate system components. For example, when a quality standard is applied to a decision then there is usually an associated impact on the quality of information that must be available. This may result in more stringent requirements for better sensors. Conversely, if many pieces of information will be available which may be correlated, then perhaps each contributing sensor may not need to be so accurate. Similarly, if there exists some required quality standard for a system to exhibit a minimum response, this may ultimately trickle down to specific choice of a prime mover with specific capabilities.

Completed DOSE Knowledge Maps are typically directed graphs that bear some resemblance to data flow diagrams, however the conventions are very different. (See FIGS. 7 and 8). Elliptical nodes represent information products, some of which may be key decision products. The key decision products are indicated with a shadow. Arrows indicate precedence relationships and identify a transition of knowledge from a lower to a higher state. The arrows do not indicate a flow of information, although the transition may imply a process with inputs and outputs that can be defined later. This is a convenient format, but those skilled in the art would be able to readily choose alternatives.

It is important to capture human cognitive elements along the way. Wherever specific human knowledge, skills, or abilities are named as required context for a decision or information, red nodes are used.

Revise/Simplify Organization Concept; Revise Partitioned Responsibilities (FIG. 1)

With the completion of the 5 steps of FIG. 1, opportunities for simplification or commonality have usually been discovered, leading to a potential revision of the initial partitionings for the knowledge cells. With the help of Cognitive Task Analysis (CTA, or similar detailed analysis of the task and procedures necessary to accomplish a specific job) the candidate configurations are examined across mission areas and problem domains for redundant responsibilities and opportunities for simplification. Based on CTA inputs, manpower allocations and automation concepts may be modified to pursue a better fit, with a potential impact to the requirements based KESs and KMs. CTA provides insight into the cognitive demands placed on individuals as well as an individual's capacity for multiplexing supervisory control functions. In turn this can lead to new insights into fundamental organizational limitations and new concepts for conducting operations.

As the KESs and KMs are examined across the decision responsibility sets, CTA can provide insight into opportunities for simplification or elimination of unnecessary redundancy. Such insights can provide ideas for a reallocation of responsibilities, potentially simplifying decision chains and increasing efficiency, hence providing additional opportunities for reduced manpower.

Finally, turning to FIG. 9, an illustrative, simplified block diagram of an automated system for use with the DOSE method is shown. In this case input is provided, e.g., by users 90 such as interviewers or intelligent agents, to a program/database subsystem 94 (which could be any of a multitude of convenient or known ways to store and process data, including computers, PDAs, network agents, etc.). The users 90 provide the illustrated data via physical or electronic representations of the knowledge cells 95, decision chains 2c, KES's 4c, KMs 3b/5b and reports 93. SMEs 91 and DE's 92 are shown providing data and information to the user 90, but one skilled in the art will appreciate how others with pertinent knowledge can be tapped for information, and how many such may directly provide predetermined categories of information to the automated subsystem 94. A skilled artisan will readily appreciate how FIG. 9 represents a high-level abstraction of a system for implementation of DOSE for illustration purposes only, and that a multitude of variations are possible in keeping with the basic purpose of facilitating the implementation of the DOSE method here described.

Some Useful Tips on Applying DOSE

Conducting DOSE interviews: When setting up the knowledge acquisition interviews, it may prove advantageous to identify two specific kinds of experts: experts experienced in operations and experts familiar with state-of-art in available systems. It may be preferable to keep sessions with the two types separate and distinct. In addition may be very useful to keep interviews as small (in number) as possible. One additional observer can facilitate if prepped on how to help the session along. This gives the interviewer a little additional time to structure the results of the session in real time. If there are additional observers, they should be given strict guidance, e.g. to only ask clarifying questions, follow the lead of the interviewer, and refrain from taking exception to a position held by the expert. Similarly, if there is no alternative but to have more than one expert in the interview, the experts should be advised to refrain from taking exception to each other's position or perceptions.

Taking best advantage of DOSE analysis results: Following the first interviews of operational subject matter experts, the named decision products may be immediately useful to all system designers as a core element of the information model for the system. Similarly, knowledge, skills and abilities identified in the earliest interviews may be immediately useful to those concerned with wrapping their arms around the training requirements for the system.

When reviewing the DOSE analysis results: One should take advantage of the knowledge map representations to take best advantage of the subject matter expert's time. Once they are generally familiar with the conventions, it is relatively easy for several experts to review and recommend improvements if the results are in KM form and large format diagrams. This is because the KMs represent a superset of information; there is no single "right" answer.

Ways to look for simplifying opportunities: One should look across several knowledge maps to discover opportunities for common information product labels and resolve definitions to a minimum set. Often key decision chain may be very similar across several domains and a generic superset decision chain may be able to be developed.

Identifying where the DOSE analysis is needed most and (first): When considering which knowledge cells to tackle first (e.g., due to fiscal constraints), one may find it helpful to use the following scale, ranked from highest likelihood for requiring human interaction to those possessing the least likelihood for requiring human interaction:

Political/Legal Constraints (Highest priority)
    Interoperability Constraints
    Command Protocols
    Operations Constraints (the way the operation works today)
    Organization/Department Protocols
    Manning Constraints
    Domain-Specific Technical Constraints
    Other Aspects of DOSE One of the useful abstractions that Systems Engineering employs is the idea of alternative system views to focus on specific system aspects. DOSE focuses on the use of methods and tools to fully describe the decision-making view of the system. The functional view and the object-oriented view are additional views that are equally useful, but focus on different aspects. For each of these alternative System Engineering views, one can find examples where the view has been augmented to consider aspects that are central to other views. For example, functional views often employ control flows and state transition diagrams to address control aspects. DOSE treats the decision-making, object (or structural), and functional (or process) views as orthogonal but interconnected.

As the name suggests, Decision Oriented Systems Engineering is based in part on the observation that most complex systems used by people are decision support systems first and foremost. Whatever else a system does functionally, each system must first satisfy the needs of its users as decision-makers (operators). DOSE uses a decision model of system responsibilities to depict and evolve requirements, preferably captured in knowledge evolution summaries and knowledge maps, although those skilled in the art will appreciate that any other convenient method for representing a system as evolution of knowledge that supports key decisions in the problem domain may be used. DOSE uses these tools to capture system responsibilities, analyze these responsibilities for possible simplification, reassignment, automation, and ultimately record allocation decisions for hardware, software, and people responsibilities in fulfilling the overall system functionality. The DOSE decision model allows analysis for identification of unnecessary duplication of common elements across the system, with significant potential for reducing risk and cost.

At first glance it may appear that DOSE further complicates an already complex job of engineering complex systems. However, DOSE can be conducted concurrently with other systems engineering activities and facilitates concurrent engineering. DOSE's focus on the needs of the decision maker complements analyses in other views, ensuring that the decision-making needs are addressed. The results of this focus are recorded in Knowledge Evolution Summaries (KESs) and KMs that record the essence of what is needed rather than how it will be accomplished, or how much of something is needed. DOSE provides a structure to record the evolving design in a decision model that maintains a view of the "whole". In similar fashion it provides a framework to study alternative organization structures and concepts, candidate configurations, manpower allocation concepts, etc., within cost and performance constraints.

While the steps of DOSE are specific, they may directly coincide with the activities of the classic System Engineering cycle: Requirements Analysis, Functional Analysis, System Synthesis, and Systems Analysis. The construction of the decision model in DOSE spans all of these activities and in fact supports and simplifies their efforts.

The decision model is captured in the KESs and the KMs. Contrasted against object models, functional models, and other models useful in capturing key aspects of the system, the models are developed to "mature" the design. The decision model captures all aspects of human control of the system. The functional model captures activities that must be performed by the system, and the object model describes the physical partitioning.

The DOSE Knowledge Maps provide a convenient presentation of the KES data in a directed graph format that clearly shows precedence in the evolution of knowledge from low-level data and information to highest-level decisions. Knowledge Map conventions allow for the identification of candidate systems (legacy or new), decision products slated for automation, and allocated manpower. The Knowledge Maps can also clearly distinguish human Knowledge Skills and Abilities (KSA) contextual elements from conventional information products. The Knowledge Maps provide a convenient forum to check if the "whole" is complete; an operations SMEs will quickly notice or detect flaws in the decision chain, and gaps in the information considered necessary to support the decisions. In the hands of the process modeler, the Knowledge Map can provide sound guidance for the construction of a functional model as well as a component model: for every knowledge transition that is highlighted on the knowledge map there must exist a process that will support its occurrence.

Finally, at the component level, knowledge based system development practices align well with the efforts of conventional software engineering. Although these knowledge-based systems are software systems they differ from conventional software systems in that they will differ in the type of knowledge that must be encoded. Software engineering for conventional software involves the representation and encoding of well-defined and often well-known algorithms. Knowledge engineering on the other hand, involves the representation of unstructured, often poorly defined heuristic knowledge that may require considerable effort to extract from the experts. Often the experts do not know how or why they know what they know. Somehow this expert knowledge must be captured and transferred into a representation that works as software. This is called knowledge acquisition and representation.

While the invention has been primarily described in connection with a particular embodiment for a process including the use of KM and KES's and interfacing with subject matter and design experts to determine key information and attributes, as noted above it is applicable to other forms of decision-oriented systems engineering and may rely upon other resources besides experts in the course of the system engineering, and the embodiments discussed above may also be useful individually with more traditional systems engineering approaches. While the foregoing constitute certain preferred and alternative embodiments of the present invention, it is to be understood that the invention is not limited thereto and that in light of the present disclosure, various other embodiments will be apparent to persons skilled in the art. The method of DOSE is equally useful for a variety of decision problems, including but not limited to strategic planning, product launch planning, program management, Tiger team planning and execution, failure analysis, etc. As an example, if the issue was a strategic planning issue, one could define the decisions required to reach a viable, executable, and successful strategic plan (and outcome) and all the required contextual information that might contribute to the solution, including special expertise, knowledge, skills, and abilities, and any other special information sources. Following the DOSE method to its logical conclusion, one would then have all the information to define and instantiate an efficient process to realize the desired strategic plan. Accordingly, it is intended that the invention not be limited to the specific illustrative embodiment but be interpreted within the full spirit and scope of the appended claims.

I claim:

1. A method of system engineering comprising building a representation of a system in as a set of knowledge cells, each knowledge cell representing a knowledge evolution within the system, with each knowledge evolution representing contexts needed to support the decisions that must be managed by a program operably structured for use with a processor.

2. A method for designing a complex system, comprising:
    a. constructing a decision model by identifying key decisions needed to capture the decision making requirements of the system, and using these requirements to guide all subsequent design efforts;
    b. further constructing the decision model by defining decision products to represent the key decisions; and
    c. describing the decision model with knowledge maps and knowledge evolution summaries.

3. A method according to claim 2 wherein step b. further comprises defining sets of responsibilities that are assignable to personnel interacting with the system.

4. A method according to claim 2, further comprising capturing operational requirements through interviews with experts experienced in a domain of interest related to the system.

5. A method according to claim 4, further comprising identifying all information elements necessary to generate a decision product, such information elements including specific human knowledge, skills, abilities, and experience as necessary.

6. A method according to claim 2, further comprising capturing design requirements through interviews with experts experienced in legacy component systems.

7. A method according to claim 5, further comprising developing design requirements and function allocations by recording the attributes for the defined decision products.

8. The method of claim 7, wherein the attributes comprises at least one of the group consisting of: (a) a list of candidate systems potentially helpful in generating the decision product; (b) a description of additional automation processes to complete generation of the decision product; (c) a description of personnel needed to determine the decision product by at least one of generating or approving a generated decision product.

9. A decision-oriented system for building a complex system, comprising:
    a. plural knowledge cells representing partitions of decision responsibilities;
    b. a decision chain, whereby key decision products needed to manage the knowledge cells are identified; p1 c. a knowledge map, whereby one or more contexts for each decision product is defined by a program operably structured for use with a processor; and
    d. a knowledge evolution summary in which one or more attributes of each decision product are recorded.

10. The system of claim 9, wherein the attributes comprise at least one of the group consisting of: (a) a list of candidate systems potentially helpful in generating a decision product; (b) a description of additional automation processes to complete generation of a decision product; (c) a description of personnel needed to determine the decision product by at least one of generating or approving a generated decision product.

11. A system for determining knowledge capturing decision products of a complex system comprising:
  a. a database component operable to maintain knowledge cells and decision products;
  b. an input device operable to receive user inputs defining knowledge cells and identifying at least one identified decision and an associated decision product for each of the plural knowledge cells;
  c. a program operably structured for use with a processor to update the database component based on the user inputs and to determine a knowledge map based on the maintained knowledge cells and decision products.

12. The system of claim 11, wherein the input device is further operable to receive user inputs identifying one or more decision products based on input naming, context definition, and user targets for each of said one or more decision products.

13. The system of claim 12, wherein the program is further operably structured to refine the knowledge map by receiving further data identifying candidate components for filling decision requirements and automation opportunities, and summarizing identified decisions and associated decision products according to predetermined rules.

14. The system of claim 13, wherein the program is further operably structured to interactively prompt inputs from a user according to predetermined rules for use in determining the knowledge map.

15. The system of claim 14, wherein the predetermined rules are expert rules providing structured querries to the user.

16. The system of claim 13, wherein the database maintains decisions and decision products in knowledge evolution summaries.

17. The system of claim 16, further comprising:
  d. an output device operable for providing a representation of the knowledge map as nodes representing knowledge evolutions from data to decision products and decision by-products.

18. The system of claim 13, wherein the program is further operably structured to refine the knowledge map into alternative configurations.

19. The system of claim 13, wherein the program is further operably structured to:
  a. define a quality target for each knowledge cell;
  b. determine a task model based on the decision products;
  c. determine knowledge transitions in the knowledge map, and determine a system functional model based on the knowledge transitions;
  d. determine functional allocations based on the decision products and defined context, and determine a workload model based on the functional allocations; and
  e. determine a functional model of the complex system based on the knowledge map and knowledge evolution summaries.

20. The system of claim 13, further comprising:
  a. at least one of the group of a human user or intelligent agent providing at least part of the said inputs to said input device.

* * * * *